(12) United States Patent
Ikimi et al.

(10) Patent No.: US 6,597,590 B2
(45) Date of Patent: Jul. 22, 2003

(54) 3-LEVEL INVERTER APPARATUS

(75) Inventors: Takashi Ikimi, Hitachi (JP); Kiyotaka Kobayashi, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/097,567

(22) Filed: Mar. 15, 2002

(65) Prior Publication Data

US 2003/0026118 A1 Feb. 6, 2003

(30) Foreign Application Priority Data

Aug. 3, 2001 (JP) .......................... 2001-236317

(51) Int. Cl.[7] .................. H02M 7/521; H02M 7/122
(52) U.S. Cl. ........................ 363/58; 363/56.05
(58) Field of Search .................... 363/132, 135, 363/136, 137, 54, 55, 56.05, 57, 58, 97, 98, 125, 128, 127, 141, 144

(56) References Cited

U.S. PATENT DOCUMENTS

| | | | | |
|---|---|---|---|---|
| 4,881,159 A | * | 11/1989 | Holtz et al. | .................... 363/58 |
| 5,910,892 A | * | 6/1999 | Lyons et al. | ................... 363/98 |
| 5,982,646 A | * | 11/1999 | Lyons et al. | ................... 363/58 |
| 6,226,192 B1 | * | 5/2001 | Yamanaka et al. | ........ 363/56.01 |
| 6,272,028 B1 | * | 8/2001 | Satoh et al. | ............. 363/56.05 |

* cited by examiner

Primary Examiner—Rajnikant B. Patel
(74) Attorney, Agent, or Firm—Antonelli, Terry, Stout, & Kraus, LLP

(57) ABSTRACT

Switching devices conjointly use snubber circuits without disposing for each switching device and is interposed between a DC neutral point N and a positive terminal plate of a DC power source. A second snubber circuit is interposed between the DC neutral point N and a negative plate terminal of a DC power source. A third snubber circuit is interposed between the DC neutral point N and an AC output terminal O. The snubber circuit suppresses the rise of the voltage when each switching device shifts from ON to OFF. The snubber circuit clamps a voltage applied to the switching device when this voltage exceeds the power source voltage during the process in which the switching device shifts from ON to OFF. The snubber circuit clamps a voltage applied to the switching device or when this voltage exceeds the power source voltage during the process.

5 Claims, 4 Drawing Sheets

6 : THIRD SNUBBER CIRCUIT
11 : FIRST DC POWER SOURCE
12 : SECOND DC POWER SOURCE
31 ~ 34 : FIRST TO FOURTH SWITCHING DEVICES
41 ~ 46 : DIODE
51 : FIRST SNUBBER CIRCUIT
52 : SECOND SNUBBER CIRCUIT

6 : THIRD SNUBBER CIRCUIT
11 : FIRST DC POWER SOURCE
12 : SECOND DC POWER SOURCE
31 ~ 34 : FIRST TO FOURTH SWITCHING DEVICES
41 ~ 46 : DIODE
51 : FIRST SNUBBER CIRCUIT
52 : SECOND SNUBBER CIRCUIT

3-LEVEL INVERTER APPARATUS

BACKGROUND OF THE INVENTION

1. Field of the Invention

This invention generally relates to a 3-level inverter and more particularly, to a 3-level inverter that will be suitable for converting a DC (direct current) to an AC (alternating current) in three operation modes.

2. Description of the Related Art

Inverters are known as power converters for driving AC motors, and 3-level invertors are particularly used for large-scale AC motors.

The 3-level inverter includes snubber circuits for preventing an excessive voltage from being applied to each switching device during the process in which four switching devices connected in series with one another shift from ON to OFF. As described in J-PA-7-312878, JP-A-8-182341 and JP-A-2000-341961, for example, the snubber circuit is provided to each switching device. The snubber circuits for use in the inverter include a charging/discharging system in which a capacitor and a resistor constitute a charging/discharging circuit, and a clamp system that clamps a voltage exceeding a voltage of a DC power source when such a voltage is applied to the switching device.

Since the snubber circuit is provided to each switching device in the prior art technologies described above, the number of components is great, the inverter cannot be easily rendered compact, reliability drops.

SUMMARY OF THE INVENTION

It is an object of the invention to provide a 3-level inverter capable of permitting switching devices to conjointly use snubber circuits without disposing the snubber circuit for each switching device.

In a 3-level inverter including first to fourth switching devices connected in series with one another with an AC output terminal being the center; first to fourth rectification devices respectively connected in reverse parallel relation with the first to fourth switching devices; a fifth rectification device connected to a DC neutral point as a junction point between first and second DC power sources connected in series with each other and to a junction point between the first and second switching devices; and a sixth rectification device connected to the DC neutral point and to a junction point between the third and fourth switching devices; the first and third switching devices and the second and fourth switching devices being ON/OFF controlled in a mutual conjugated relation; the object of the invention described above can be accomplished by a 3-level inverter that comprises a first snubber circuit for clamping a voltage applied to the first or third switching device when the voltage exceeds a power source voltage during the processing in which the first or third switching device shifts from ON to OFF; a second snubber circuit for clamping a voltage applied to the second or fourth switching device when the voltage exceeds a power source voltage during the processing in which the second or fourth switching device shifts from ON to OFF; and a third snubber circuit interposed between the DC neutral point and the AC output terminal, for constituting a charging/discharging circuit.

When constituting the 3-level inverter, the invetor may include, as the snubber circuits, first and second snubber circuits each comprising a series circuit of a capacitor and a resistor as main constituent elements, and a third snubber circuit constituting a series circuit of a capacitor and a resistor. In this case, the first snubber circuit is connected to a positive plate terminal of the DC neutral point and to a negative plate terminal of the second DC power source, and the third snubber circuit is connected to the DC neutral point and to the AC output terminal.

A snubber rectification device may be connected in this case in parallel with a resistor of each of the first and second snubber circuits. The anode side of the first snubber rectification device of the first snubber circuit is connected to a positive plate terminal of the first DC power source and the cathode side of the snubber rectification device of the second snubber circuit is connected to a positive plate terminal of the second DC power source.

To constitute each 3-level inverter described above, the first to fourth switching devices may be insulated gate type semiconductor switching devices, for example IGBT or MOSFET.

In the construction described above, the third snubber circuit retards the rise of the voltage applied to the switching device among the first to fourth switching devices that shifts from ON to OFF, the first snubber circuit clamps the voltage applied to the first or third switching device when this voltage exceeds the power source voltage during the process in which the first or third switching device shifts from ON to OFF, and the second snubber circuit clamps the voltage applied to the second or fourth switching device when this voltage exceeds the power source voltage during the process in which the second or fourth switching device shifts from ON to OFF. Therefore, the invention can prevent an excessive voltage from being applied to each switching device by using a smaller number of snubber circuits than the number of the switching devices, can render the inverter compact in size, can improve reliability and efficiency and can reduce the production cost.

Other objects, features and advantages of the invention will become apparent from the following description of the embodiments of the invention taken in conjunction with the accompanying drawings.

DESCRIPTION OF THE EMBODIMENT

Figure 1:
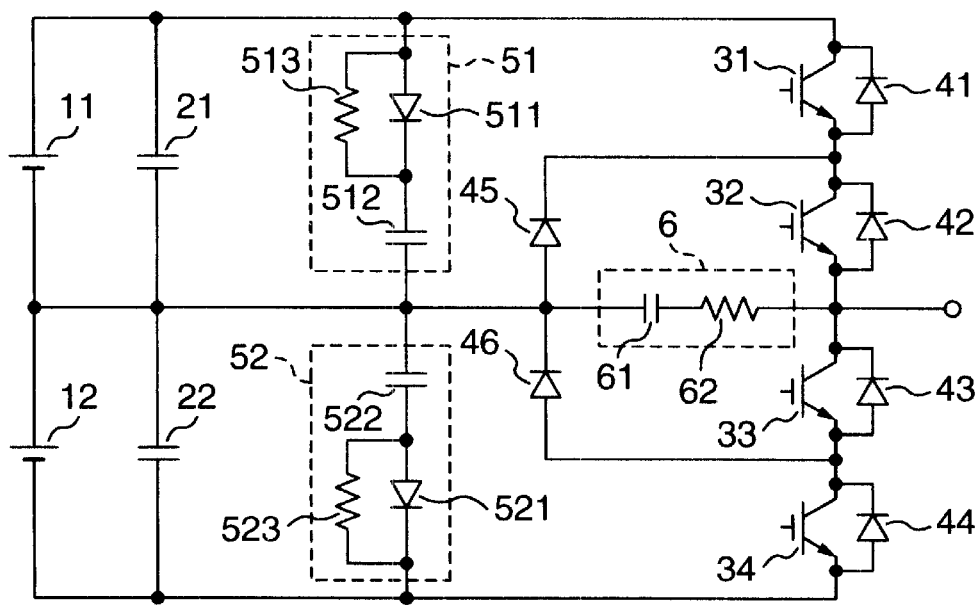
FIG. 1 is a structural circuit diagram of a 3-level inverter according to an embodiment of the invention.
Figure 2:
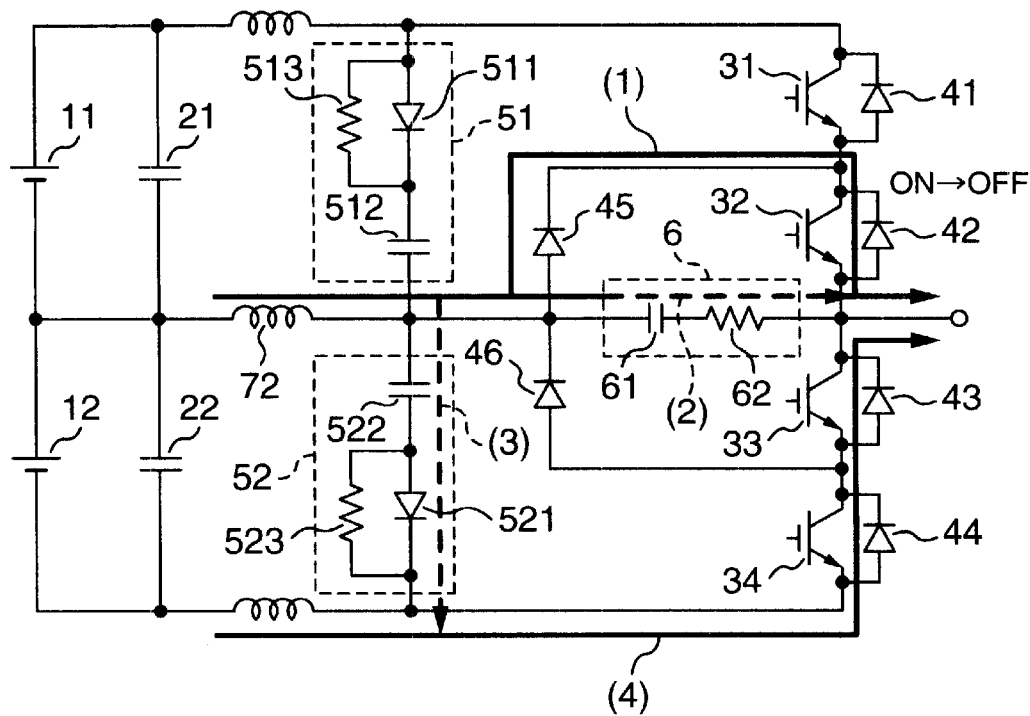
FIG. 2 is a structural circuit diagram useful for explaining an operation of a process in which a switching device 32 shifts from ON to OFF.

A preferred embodiment of the invention will be hereinafter explained with reference to the accompanying drawings. FIG. 1 is a structural circuit diagram of a 3-level inverter according to an embodiment of the invention. Referring to FIG. 1, a 3-level inverter includes a first DC power source 11, a second DC power source, a first smoothing capacitor 21, a second smoothing capacitor 22, a first snubber circuit 51, a second snubber circuit 52, a third snubber circuit 6, a first switching device 31, a second switching device 32, a third switching device 33, a fourth switching device 34 and diodes 41 to 46.

The DC power sources 11 and 12 are connected in series with each other. A mutual junction point between these DC power sources 11 and 12 is a DC neutral point (neutral point output terminal) N. The smoothing capacitor 21 and the first snubber circuit 51 are connected in parallel with both ends of the DC power source 11. The smoothing capacitor 22 and the second snubber circuit 52 are connected in parallel with both ends of the DC power source 12. The first snubber circuit 51 includes a diode 511, a capacitor 512 and a resistor 513 as rectification devices for a snubber circuit. The second snubber circuit 52 includes a diode 521, a capacitor 522 and a resistor 523 as rectification devices for a snubber circuit. The capacitor 512 and the resistor 513 are connected in series, and the diode 511 is connected to both ends of the resistor 513. The anode side of this diode 511 is connected to a positive plate terminal of the DC power source 11. The capacitor 522 and the resistor 523 are connected in series, and the diode 521 is connected in parallel with both ends of the resistor 523. The cathode side of the diode 521 is connected to a negative plate terminal of the DC power source 12.

The first to fourth switching devices 31 to 34 are mutually connected in series with an AC output terminal O as the center. Each switching device 31 to 34 uses IGBT (Insulated Gate Bipolar Transistor) or MOSFET (Metal Oxide Semi-conductor Field Effect Transistor), for example. Diodes 41 to 44 as the first to fourth rectification devices are respectively connected in parallel with both ends (emitter and collector) of these switching devices 31 to 34. A switching signal generator (not shown) inputs a switching signal for ON/OFF control of each switching device 31 to 34 to the gate of each switching device 31 to 34. A cathode side of a diode 45 as the fifth rectification device is connected to a junction point T1 between the first switching device 31 and the second switching device 32, and its anode side is connected to a DC neutral point N. An anode side of a diode 46 as the sixth rectification device is connected to a junction point T2 between the third switching device 33 and the fourth switching device 34, and its cathode side is connected to the DC neutral point N.

The third snubber circuit 6 is inserted between the AC output terminal O as the junction of the second switching device 32 and the third switching device 33 and the DC neutral point N. The snubber circuit 6 is constituted by a series circuit of a capacitor 61 and a resistor 62.

In the 3-level inverter having the construction described above, the first switching device 31 and the third switching device 33 are ON/OFF controlled in the conjugate relation, and the second switching device 32 and the fourth switching device 34 are likewise ON/OFF controlled in the conjugate relation.

More concretely, when the 3-level inverter is in the first mode 1, the first switching device 31 is ON, the third switching device is OFF, the second switching device is ON and the fourth switching device is OFF. A signal corresponding to the output voltage V of the DC power source 11 is outputted at this time from the AC output terminal O. Next, in the mode 2, the switching device 31 is OFF, the switching device 33 is ON, the switching device 32 is ON and the switching device 34 is OFF. The output voltage of the AC output terminal O falls at this time to the O level. In the mode 3, the switching device 31 is OFF, the switching device 33 is ON, the switching device 32 is OFF and the switching device 44 is ON. A signal of a voltage −V corresponding to the output voltage of the DC power source 12 is outputted from the AC output terminal O. When the control in these modes 1, 2 and 3 is repeated, the DC voltage is converted to the AC voltage and is outputted.

Next, the concrete operation of this 3-level inverter will be explained with reference to FIGS. 2 to 7. First, the operation when the switching device 31 changes from ON to OFF will be explained with reference to FIGS. 2 to 4.

When the switching device 32 is ON, a current flows through a route (1) ranging from the DC neutral point N through the diode 41, the switching device 32 and the DC output terminal O to the load. Here, when the switching device 32 changes from ON to OFF, the current is to continue to flow due to the influences of the wiring inductance 72 of the DC neutral point N. In consequence, the current flows through the route (2) that passes the snubber circuit 6, and charges the capacitor 61. When the charging voltage of the capacitor 61 rises, the current then pass through the route (3) passing the third snubber circuit 52, and charges the capacitor 522. Since a reverse voltage is applied at this time to the wiring inductance 72 of the DC neutral point N, the current of the route (1) decreases and then commutes the route for the route (3) ranging from the negative plate terminal of the DC power source 12 and passing the switching device 34 and the switching device 33.

Figure 3:
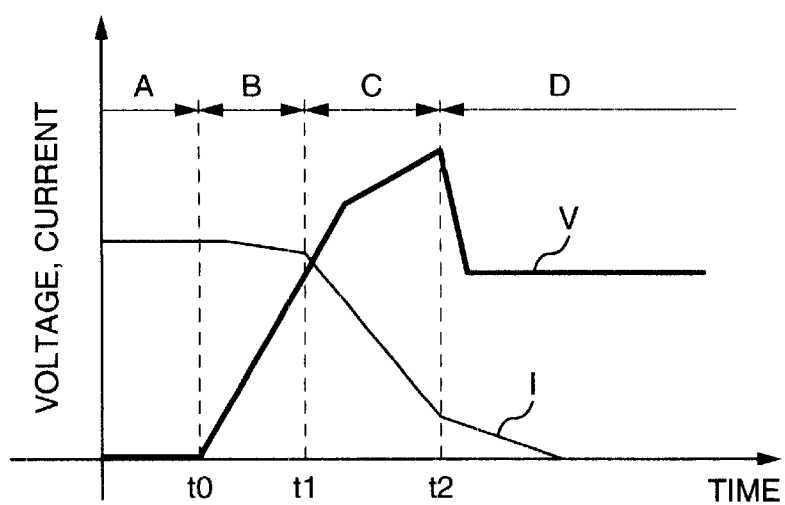
FIG. 3 is a graph showing current-voltage characteristics when a snubber circuit 6 does not exist during the process in which the switching device 32 shifts from ON to OFF.
Figure 4:
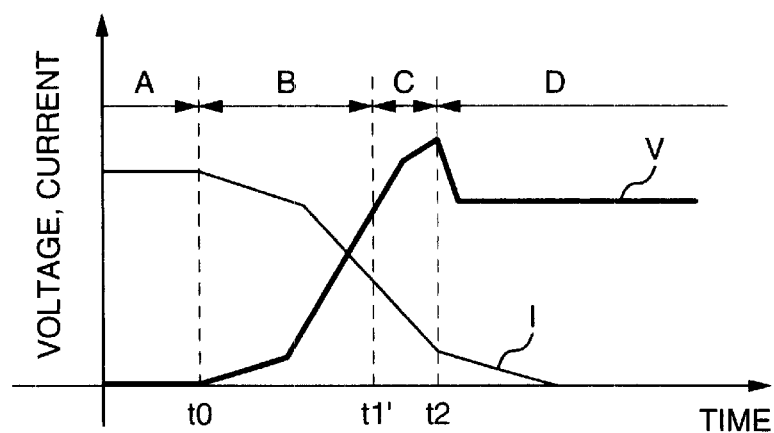
FIG. 4 is a graph showing current-voltage characteristics when the snubber circuit 6 exists during the process in which the switching device 32 shifts from ON to OFF.

FIG. 3 shows current-voltage characteristics when the snubber circuit 6 does not exist and FIG. 4 shows the current-voltage characteristics when the snubber circuit 6 exists.

Referring to FIG. 3, the device voltage keeps a low value in the period A up to time t0 in which the switching device 32 starts changing from the ON state to the OFF state. When the switching device 32 starts changing to the OFF state at time t0, the load current immediately starts commuting to the route (3) in FIG. 2 when the snubber circuit 6 does not exist. Therefore, the voltage of the DC power source 12 is applied to the switching device 32, and the voltage of the switching device 32 drastically rises. From the time t1 on in which the device voltage applied to the switching device 32 exceeds the voltage of the DC power source 12, the reverse voltage is applied to the wiring inductance 72 of the DC neutral point N, so that the device current drastically decreases. At this time, the current of the wiring inductance 72 flows into the second snubber circuit 52 and charges the capacitor 522. In consequence, the device voltage gradually rises. When the device current thereafter becomes constant, the change of the current becomes small. In consequence, the device voltage drops and approaches the voltage (power source voltage) of the DC power source 12. The greater the current, the greater becomes the rise of the device voltage in the period C. When this voltage rise exceeds the withstand voltage of the switching device 32, the switching device 32 may undergo breakdown.

On the other hand, when the snubber circuit 6 exists and when the switching device 32 starts changing from the ON state to the OFF state at time t0 as shown in FIG. 4, the load current first commutes to the route (2) passing the snubber circuit 6, and charges the capacitor 61. In consequence, the device voltage gradually rises. From the time t1 on in which the device voltage applied to the switching device 32 exceeds the voltage of the DC power source 12, the device current drastically drops. At this time, the current of the wiring inductance 72 flows into the second snubber circuit 52 and charges the capacitor 522. In consequence, the device voltage gradually rises. However, the device current has already decreased and the subsequent voltage rise is by far smaller than the voltage rise shown in FIG. 3. Therefore, the peak voltage of the device voltage becomes lower, and the application of the over-voltage to the switching device 32 can be suppressed.

As described above, the snubber circuit 6 constitutes the charging-discharging circuit during the process in which the switching device 32 changes from ON to OFF, and the rise of the voltage applied to the switching device 32 can be suppressed. In other words, the time required for the device voltage applied to the switching device 32 to reach the power source voltage of the DC power source 12 is t1 when the snubber circuit 6 does not exists and is t1' when it does. In this way, the time required for the device voltage to reach the voltage of the DC power source 12 can be retarded. When the voltage applied to the switching device 32 exceeds the power source voltage 12, the snubber circuit 52 clamps this voltage. Incidentally, the time from t0 to t2 is 1 μS.

Next, the operation when the switching device 31 shifts from the ON state to the OFF state will be explained with reference to FIGS. 5 to 7.

Figure 5:
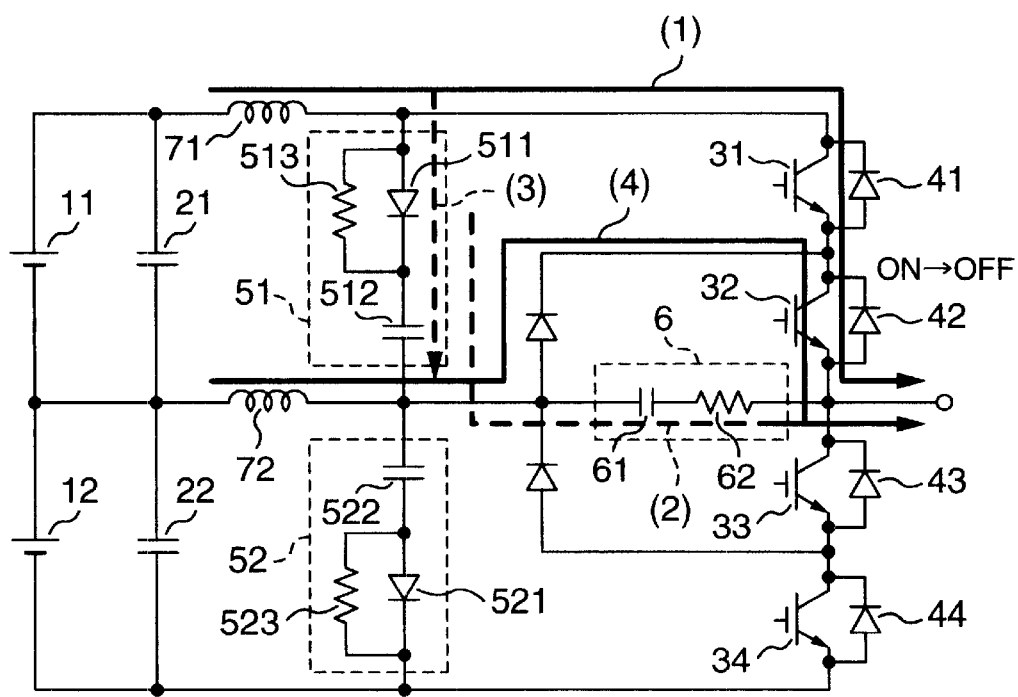
FIG. 5 is a structural circuit diagram useful for explaining an operation of a process in which a switching device 31 shifts from ON to OFF.

Referring to FIG. 5, when the switching device 31 is ON, the current flows from the positive plate terminal of the DC power source 11 through the switching devices 31 and 32 by taking the route (1) from the AC output terminal O to the load. Here, when the switching device 31 is turned OFF from ON, the current is to keep flowing due to the influences of the wiring inductance 71 of the DC neutral point N. Therefore, the current flows through the route (2) passing the snubber circuits 51 and 6 and charges the capacitor 61. When the charging voltage of the capacitor 61 rises, the current then flows through the route (3) passing the snubber circuit 51, the diode 45 and the switching device 32, and charges the capacitor 512. Since the reverse voltage is applied at this time to the wiring inductance 71 of the DC neutral point N, the current of the route (1) decreases and commutes to the route (4) extending from the DC neutral point N to the diode 45 and the switching device 32.

Figure 6:
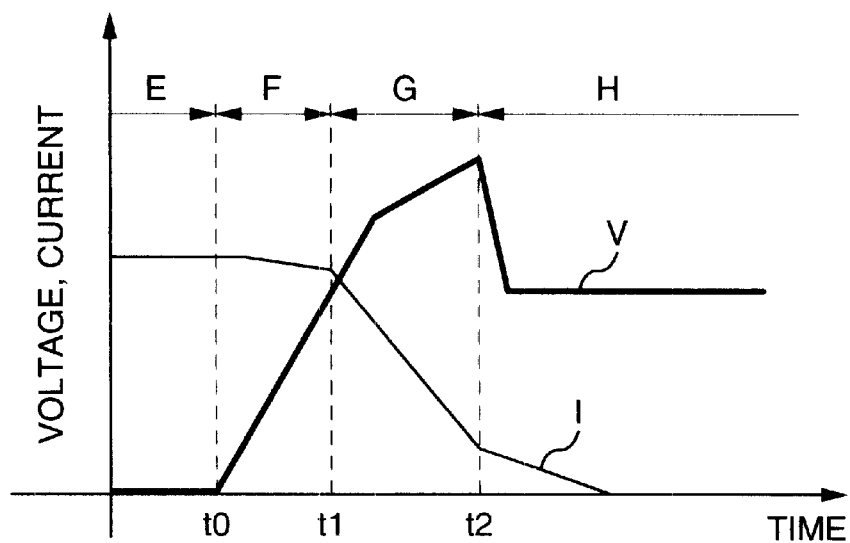
FIG. 6 is a graph showing current-voltage characteristics when the switching device 31 shifts from ON to OFF.
Figure 7:
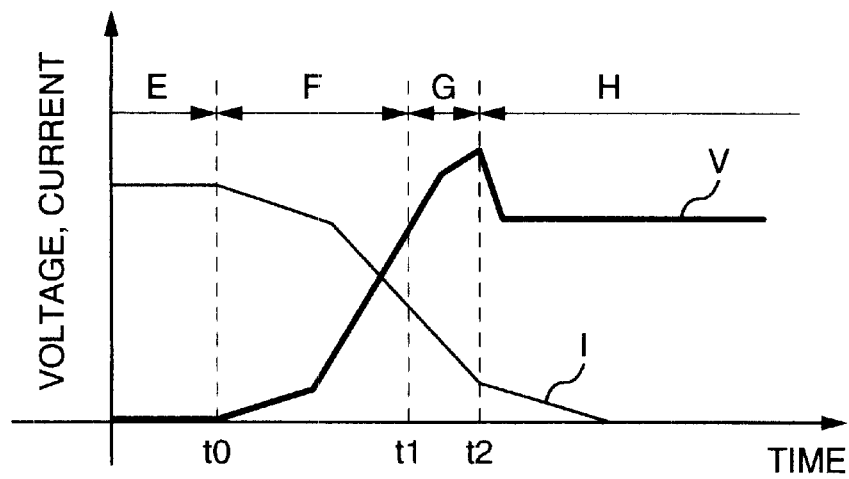
FIG. 7 is a graph showing current-voltage characteristics when the snubber circuit 6 exists during the process in which the switching device 31 shifts from ON to OFF.

FIG. 6 shows current-voltage characteristics when the snubber circuit 6 does not exist and FIG. 7 shows current-voltage characteristics when it does.

Referring to FIG. 6, the device voltage keeps a low value during the period A to the time t0 in which the switching device 31 starts changing from the ON state to the OFF state. When the switching device 31 starts changing to the OFF state at the time t0, the load current immediately starts commuting to the route (3) when the snubber circuit 6 does not exist. The voltage of the DC power source 11 is applied to the switching device 31 and the voltage of this switching device 31 drastically rises. From the time t1 on at which the devoice voltage applied to the switching device 31 exceeds the voltage of the DC power source 11, the reverse voltage is applied to the wiring inductance 71 of the DC neutral point N and the device current drastically decreases. The current of the wiring inductance 71 flows at this time into the first snubber circuit 51 and charges the capacitor 512. Therefore, the device voltage gently rises. When the device current flowing through the switching device 31 drops to a predetermined value, the current change becomes small, so that the device voltage drops and approaches the voltage of the DC power source 11. The greater the current, the greater the rise of the device voltage during the period C, and when the device voltage exceeds the withstand voltage of the switching device 31, the switching device 31 may undergo breakdown.

When the snubber circuit 6 exists, on the other hand, and when the switching device 31 starts changing from the ON state to the OFF state at the time t0, the load current first commutes to the route (2) passing the snubber circuit 6 and charges the capacitor 61. In consequence, the device voltage applied to the switching device 31 gradually rises. From the time t1 on in which this device voltage exceeds the voltage of the DC voltage, the device current drastically decreases. At this time, the current of the wiring inductance 71 flows into the snubber circuit 51 and charges the capacitor 512. Therefore, the device voltage gradually rises. Since the device current has already decreased, however, the subsequent voltage rise is by far smaller than the voltage rise shown in FIG. 6. In consequence, the peak voltage of the device voltage becomes low, and the over-voltage is prevented from being applied to the switching device 31.

The snubber circuit 6 can suppress the rise of the voltage applied to the switching device 31 during the process in which the switching device 31 shifts from the ON state to the OFF state, too. Due to the operation of the snubber circuit 6, the time required for the voltage applied to the switching device 31 to reach the power source voltage of the DC power source 11 is t1' as shown in FIG. 7. Therefore, the time required for the device voltage to reach the voltage of the DC power source 11 can be retarded in comparison with the time t1 when the snubber circuit 6 does not exist. When a voltage exceeding the power source voltage of the DC power source 11 is applied to the switching device 31, the snubber circuit 51 can clamp this voltage.

Using a smaller number of snubber circuits 6, 51 and 52 than the number of switching devices 31 to 34, this embodiment can make gentle the voltage change when each switching device cuts off the current, and can prevent an excessive voltage from being applied to the switching devices 31 to 34 by suppressing the peak value of the voltage. In other words, since the switching devices 31 to 34 conjointly use the snubber circuits 6, 51 and 52, it becomes possible to decrease the number of components and to prevent the over-voltage from being applied to each switching device. Therefore, this embodiment can contribute to the reduction of the size of the inverter and the improvement in reliability and efficiency.

In the invention described above, the third snubber circuit retards the rise of the voltage applied to the switching device that shifts from ON to OFF among the first to fourth switching devices, the first snubber circuit clamps the voltage when the voltage applied to the first or third switching device exceeds the power source voltage during the process in which the first or third switching device shifts from ON to OFF, and the second snubber circuit clamps the voltage when the voltage applied to the second or fourth switching circuit exceeds the power source voltage during the process in which the second or fourth switching device shifts from ON to OFF. Therefore, this embodiment can prevent the excessive voltage from being applied to each switching device by using a smaller number of snubber circuits than the number of switching devices, can reduce the size of the inverter and can contribute to the improvement in reliability and efficiency.

It should be further understood by those skilled in the art that the foregoing description has been made on embodiments of the invention and that various changes and modifications may be made in the invention without departing from the spirit of the invention and the scope of the appended claims.

What is claimed is:

1. A 3-level inverter including:

first to fourth switching devices connected in series with one another with an AC output terminal being the center;

first to fourth rectification devices respectively connected in reverse parallel relation with said first to fourth switching devices;

a fifth rectification device connected to a DC neutral point as a junction point between first and second DC power sources connected in series with each other and to a junction point between said first and second switching devices; and a sixth rectification device connected to said DC neutral point and to a junction point between said third and fourth switching devices;

said first and third switching devices and said second and fourth switching devices being ON/OFF controlled in a mutual conjugated relation;

said 3-level inverter comprising:

a first snubber circuit for clamping a voltage applied to said first or third switching device when said voltage exceeds a power source voltage during the processing in which said first or third switching device shifts from ON to OFF;

a second snubber circuit for clamping a voltage applied to said second or fourth switching device when said voltage exceeds a power source voltage during the processing in which said second or fourth switching device shifts from ON to OFF; and a third snubber circuit interposed between said DC neutral point and said AC output terminal, for constituting a charging/discharging circuit.

2. A 3-level inverter including:

first to fourth switching devices connected in series with one another with an AC output terminal being the center;

first to fourth rectification devices respectively connected in reverse parallel relation with said first to fourth switching devices;

a fifth rectification device connected to a DC neutral point as a junction point between first and second DC power sources connected in series with each other and to a junction point between said first and second switching devices; and a sixth rectification device connected to said DC neutral point and to a junction point between said third fourth switching devices;

one of the ends of said first switching device being connected to a positive plate terminal of said first DC power source;

one of the ends of said fourth switching device being connected to a negative plate terminal of said second DC power source;

said first and third switching devices and said second and fourth switching devices being ON/OFF controlled in a mutual conjugated relation;

said 3-level inverter comprising:

first and second snubber circuits each comprising a series circuit of a capacitor and a resistor as principal components; and a third snubber circuit comprising a series circuit of a capacitor and a resistor;

wherein said first snubber circuit is connected to a positive plate terminal of said first DC power source and to said DC neutral point, said second snubber circuit is connected to said DC neutral point and a negative plate terminal of said second DC power source, and said third snubber circuit is connected to said DC neutral point and to said AC output terminal.

3. A 3-level inverter according to claim 2, wherein a snubber rectification device is connected in parallel with said resistor of each of said first and second snubber circuits.

4. A 3-level inverter according to claim 3, wherein an anode side of said snubber rectification device of said first snubber circuit is connected to the positive pate terminal of said first DC power source and a cathode side of said snubber rectification device of said second snubber circuit is connected to the negative plate terminal of said second DC power source.

5. A 3-level inverter according to any of claims 1 to 2, wherein said first to fourth switching devices comprise IGBT or MOSFET.

* * * * *